United States Patent
Hu

(10) Patent No.: US 11,554,537 B2
(45) Date of Patent: Jan. 17, 2023

(54) POLYMER FILAMENTS COMPRISING A METAL PRECURSOR FOR ADDITIVE MANUFACTURING AND METHODS ASSOCIATED THEREWITH

(71) Applicant: Xerox Corporation, Norwalk, CT (US)

(72) Inventor: Nan-Xing Hu, Oakville (CA)

(73) Assignee: Xerox Corporation, Norwalk, CT (US)

( * ) Notice: Subject to any disclaimer, the term of this patent is extended or adjusted under 35 U.S.C. 154(b) by 90 days.

(21) Appl. No.: 17/171,500

(22) Filed: Feb. 9, 2021

(65) Prior Publication Data
US 2022/0250310 A1    Aug. 11, 2022

(51) Int. Cl.
| | |
|---|---|
| *B29C 64/118* | (2017.01) |
| *B33Y 10/00* | (2015.01) |
| *B33Y 30/00* | (2015.01) |
| *B33Y 80/00* | (2015.01) |
| *B29C 64/273* | (2017.01) |
| *B33Y 70/10* | (2020.01) |

(52) U.S. Cl.
CPC .......... *B29C 64/118* (2017.08); *B29C 64/273* (2017.08); *B33Y 10/00* (2014.12); *B33Y 30/00* (2014.12); *B33Y 70/10* (2020.01); *B33Y 80/00* (2014.12)

(58) Field of Classification Search
None
See application file for complete search history.

(56) References Cited

U.S. PATENT DOCUMENTS

| | | | |
|---|---|---|---|
| 2016/0361872 A1* | 12/2016 | El-Siblani | B29C 64/135 |
| 2017/0066954 A1* | 3/2017 | Chua | B29C 48/022 |
| 2017/0282457 A1* | 10/2017 | Burns | B29C 64/30 |
| 2018/0099334 A1* | 4/2018 | Peters | B28B 1/001 |

(Continued)

FOREIGN PATENT DOCUMENTS

| | | | | |
|---|---|---|---|---|
| EP | 3265293 A1 | | 1/2018 | |
| EP | 3878629 A1 * | 9/2021 | | B29C 64/118 |

(Continued)

OTHER PUBLICATIONS

Extended European Search Report of corresponding EP Application No. 22152562.9 dated Jun. 28, 2022.

*Primary Examiner* — Yung-Sheng M Tsui
(74) *Attorney, Agent, or Firm* — Vorys, Safer, Seymour and Pease LLP

(57) ABSTRACT

Additive manufacturing processes, such as fused filament fabrication, may be employed to form printed objects in a range of shapes. It is sometimes desirable to form conductive traces upon the surface of a printed object. Conductive traces and similar features may be introduced in conjunction with fused filament fabrication processes by incorporating a metal precursor in a polymer filament having a filament body comprising a thermoplastic polymer, and forming a printed object from the polymer filament through layer-by-layer deposition, in which the metal precursor remains substantially unconverted to metal while forming the printed object. Suitable polymer filaments compatible with fused filament fabrication may comprise a thermoplastic polymer defining a filament body, and a metal precursor contacting the filament body, in which the metal precursor is activatable to form metal islands upon laser irradiation.

13 Claims, 3 Drawing Sheets

(56) References Cited

U.S. PATENT DOCUMENTS

| | | | | |
|---|---|---|---|---|
| 2019/0292386 A1* | 9/2019 | Meura | .................... | C08L 63/00 |
| 2019/0358899 A1* | 11/2019 | Stavrinadis | ............. | B29C 70/58 |
| 2020/0269501 A1* | 8/2020 | Chaffins | .................. | C08K 3/08 |
| 2020/0308330 A1* | 10/2020 | Veregin | ............... | C08F 255/023 |
| 2021/0283837 A1* | 9/2021 | Wei | ......................... | C23C 18/42 |
| 2021/0284830 A1* | 9/2021 | Doris | ................. | C23C 18/1644 |
| 2021/0370547 A1* | 12/2021 | Natarajan | ......... | C04B 35/63444 |
| 2021/0402468 A1* | 12/2021 | Kasperchik | ............. | B22F 10/28 |
| 2022/0259465 A1* | 8/2022 | Kugel | ....................... | C09J 5/06 |

FOREIGN PATENT DOCUMENTS

| | | | |
|---|---|---|---|
| EP | 3878629 A1 | | 9/2021 |
| JP | 2021188128 A | * | 12/2021 |
| WO | 2015285155 A1 | | 12/2015 |
| WO | 2016142147 A1 | | 9/2016 |

\* cited by examiner

POLYMER FILAMENTS COMPRISING A METAL PRECURSOR FOR ADDITIVE MANUFACTURING AND METHODS ASSOCIATED THEREWITH

FIELD

The present disclosure generally relates to additive manufacturing and, more particularly, additive manufacturing processes taking place by fused filament fabrication, in which a metal precursor activatable by laser irradiation is incorporated during the printing process.

BACKGROUND

Additive manufacturing, also known as three-dimensional (3-D) printing, is a rapidly growing technology area. Although additive manufacturing has traditionally been used for rapid prototyping activities, this technique is being increasingly employed for producing commercial and industrial parts (objects) in any number of complex shapes. Additive manufacturing processes operate by layer-by-layer deposition of either 1) a stream of molten printing material obtained from a continuous filament or 2) powder particulates of a printing material. The layer-by-layer deposition usually takes place under control of a computer to deposit the printing material in precise locations based upon a digital three-dimensional "blueprint" (a computer-aided design model) of the part to be manufactured, with consolidation of the printing material taking place in conjunction with deposition to form the printed part. The printing material forming the body of a printed part may be referred to as a "build material" herein.

Additive manufacturing processes employing a stream of molten printing material for part formation typically utilize a thermoplastic polymer filament as a source of the molten printing material. Such additive manufacturing processes are sometimes referred to as "fused deposition modeling" or "fused filament fabrication" processes. The latter term is used herein.

Additive manufacturing processes employing powder particulates of a printing material oftentimes perform directed heating in selected locations of a particulate bed following printing material deposition to promote localized coalescence of the powder particulates into a consolidated part. Techniques suitable for promoting consolidation of powder particulates to form a consolidated part include, for example, Powder Bed Fusion (PBF), selective laser sintering (SLS), Electron Beam Melting (EBM), Binder Jetting and Multi-Jet Fusion (MJF).

A wide range of parts having various shapes may be fabricated using both types of additive manufacturing processes. One characteristic of both types of additive manufacturing processes is that in order for a part to be manufactured "additively," there must be an underlying structure upon which to deposit the printing material for layer-by-layer buildup of the part to take place. The initial layers of a printed part may be deposited upon the print bed (stage) of a three-dimensional printer, and subsequent layers may then be deposited upon the initially deposited layers. In the case of powder deposition processes, the subsequent layers may be supported by underlying layers of a powder bed, which may either be consolidated to form a portion of the part or remain unconsolidated. In contrast, parts manufactured by deposition of a molten printing material, such as by fused filament fabrication, lack a corresponding support structure formed from unconsolidated printing material. As a printed part grows from the print bed in fused filament fabrication processes, there may be overhangs and similar structures by virtue of the part's shape that are no longer in direct contact with the print bed or with previously deposited layers of consolidated printing material. Parts having overhangs and similar structures may not be directly printed by fused filament fabrication as a result, since the printing material cannot be deposited in free space without the presence of an underlying support. As a solution to the problem of overhangs and similar structures in fused filament fabrication processes, a common strategy is to deposit the build material and a sacrificial printing material concurrently (e.g., from a dual extruder print head), wherein the sacrificial printing material may be formed as a removable support in selected locations for depositing and consolidating the build material thereon. Upon the completion of printing, the removable support may be eliminated by a suitable technique, such as through degradation or dissolution, to yield an unsupported (free) part.

Parts manufactured by fused filament fabrication and through particulate consolidation may appear rather similar to one another on the macroscale, but they may be distinguishable on the microscale. Printed parts made through particulate consolidation may show evidence of grain boundaries throughout substantially the entirety of the part. Depending on the extent of particulate consolidation that takes place, the grain boundaries may be more observable in some cases than in others. Printed parts made by fused filament fabrication, in contrast, do not have uniformly distributed grain boundaries. Along a printed line formed from a molten polymer in fused filament fabrication, there are substantially no grain boundaries, but there may be evidence of incomplete consolidation between adjacent printed lines or layers. Thus, in a fused filament fabrication polymer matrix, boundaries indicative of incomplete printed line consolidation do not show evidence of a residual particulate structure, which may be a characteristic feature of particulate consolidation processes.

In some instances, it can be desirable for additional functional characteristics to be present upon the surface of an additively manufactured part. In a particular example, electrically conductive traces may be introduced upon the surface of an additively manufactured part through a separate inkjet printing, aerosol jet, or direct writing process to deposit an ink that is infused with a conductive material, such as graphite or metal, upon the surface of the part, followed by curing or sintering to promote formation of an electrically conductive pathway (conductive trace). Deposition of such conductive inks occurs under completely different conditions than does the additive manufacturing process, thereby requiring transfer of the printed part between production lines. This process can be cumbersome and time consuming in many cases, particularly when extreme accuracy is needed for placement of the conductive traces. Accurate placement of conductive traces upon a non-planar surface of a printed part may be especially problematic when forming conductive traces in this manner. Further difficulties may arise due to poor adhesion between particular thermoplastic polymers and conductive inks used in conjunction with inkjet and aerosol jet printing processes.

SUMMARY

The present disclosure provides polymer filaments compatible with fused filament fabrication. The polymer filaments comprise: a thermoplastic polymer defining a filament body; and a metal precursor contacting the filament body, the metal precursor being activatable to form metal islands upon laser irradiation.

The present disclosure also provides printed objects comprising a fused filament fabrication polymer matrix comprising a metal precursor within at least a portion thereof, the metal precursor being activatable to form metal islands upon laser irradiation.

The present disclosure also provides methods for forming printed objects, comprising: providing a polymer filament comprising a thermoplastic polymer defining a filament body, and a metal precursor contacting the filament body, the metal precursor being activatable to form metal islands upon laser irradiation; and forming a printed object from the polymer filament through layer-by-layer deposition; wherein the metal precursor remains substantially unconverted to metal while forming the printed object.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one having ordinary skill in the art and having the benefit of this disclosure.

DETAILED DESCRIPTION

Figure 1:
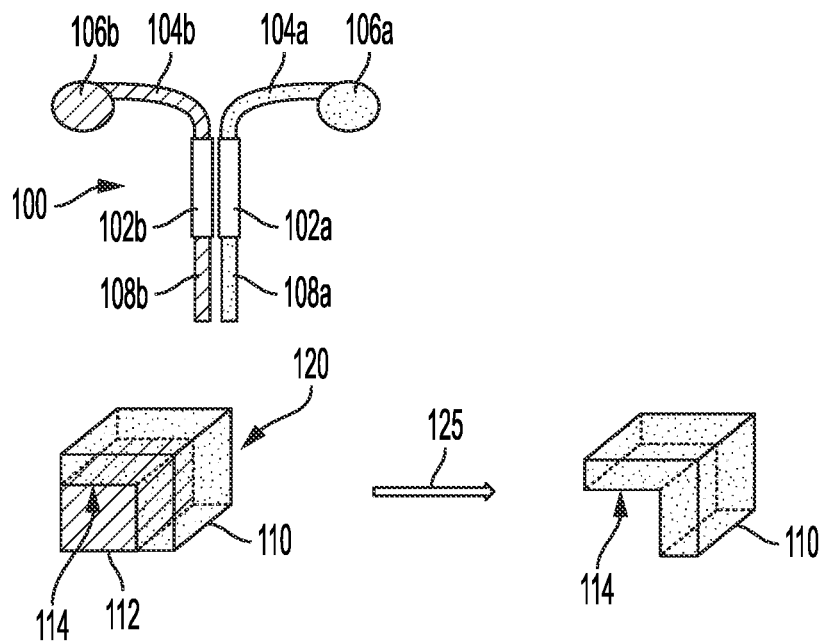
FIG. 1 is a diagram of an illustrative fused filament fabrication process for producing a printed object using a build material and a removable support material.

The present disclosure generally relates to additive manufacturing and, more particularly, additive manufacturing processes taking place by fused filament fabrication, in which a metal precursor activatable by laser irradiation is incorporated during the printing process. The metal precursor may remain unactivated during deposition of the printing material in accordance with the disclosure herein. Thereafter, the metal precursor may become activated to form metal islands, which may then be interconnected to form a conductive trace in a desired pattern.

As discussed above, additive manufacturing processes, such as fused filament fabrication, are powerful tools for generating printed parts (objects) in a wide range of complex shapes. At present, it is not feasible to introduce conductive traces upon the surface of printed parts as an integral portion of the additive manufacturing process. Instead, a separate aerosol, inkjet or direct printing technique is employed to deposit conductive inks upon the surface of a printed part, with subsequent curing or sintering being conducted to promote electrical conductivity. The separate printing technique to deposit the conductive inks may limit processing throughput and sometimes lead to inaccurate placement of the conductive traces. In some instances, there may also be poor adhesion between a thermoplastic polymer comprising the printed object and the conductive ink used to deposit the conductive traces.

Advantageously, the present disclosure provides a route whereby metal islands may be introduced during additive manufacturing processes taking place through fused filament fabrication but without necessarily transferring the part to a separate printing production line following part manufacture. In particular, the present disclosure employs polymer filaments comprising a thermoplastic polymer defining a filament body and a metal precursor in contact with the filament body and that is activatable by laser irradiation, particularly with a pulsed laser, to promote formation of discontinuous metal islands upon the surface of a printed object formed by additive manufacturing, specifically fused filament fabrication. Suitable metal precursors are non-conductive prior to activation and comprise a metal in a coordinated state and/or in a salt form. Following activation, the metal precursor may be converted into a metallic conductor in the form of discontinuous metal islands, which may be accurately placed through careful positioning of the laser. The discontinuous metal islands may then become interconnected to form one or more conductive traces upon the surface of the printed object. Patterning of the conductive traces may determine the shape of the conductive trace(s) formed therefrom. Advantageously, a laser for promoting formation of metal islands may be incorporated during a printing process taking place by fused filament fabrication, thereby allowing the metal islands to be introduced accurately as a printed object is formed and/or after a printed object is formed. Alternately, a laser separate from the printing process may be used for activating a metal precursor to form metal islands once the printing process is complete. In either case, the metal islands are formed in particular locations of the printed object where suitably activated by directed laser irradiation.

A wide range of metal precursors may be employed in the disclosure herein and are discussed in further detail below. Advantageously, such metal precursors may be readily incorporated within polymer filaments that are suitable for use in fused filament fabrication and similar additive manufacturing processes. Such polymer filaments may be formed from thermoplastic polymers blended with a metal precursor, such as produced through extrusion of a melt blend, for example. Metal precursors do not interfere with the filament extrusion process, nor with the consolidation process taking place thereafter to form a printed object. Alternately, a metal precursor may be localized upon the outer surface of a polymer filament and/or within an inner core of a polymer filament suitable for use in the disclosure herein.

As a further advantage, metal precursors are also compatible for use in combination with sacrificial printing materials used in conjunction with forming overhangs and similar structures in printed objects. Conditions for removing a support structure formed from a sacrificial printing material may afford substantially no activation of the metal precursor to form metal. Depending on location, activation of the metal precursors may take place before and/or after removing a support structure formed from a sacrificial printing material.

Terms used in the description and claims herein have their plain and ordinary meaning, except as modified by the paragraphs below.

As used herein, the term "thermoplastic polymer" refers to a polymer material that softens and hardens reversibly on heating and cooling. Thermoplastic polymers encompass thermoplastic elastomers.

As used herein, the term "oxide" refers to both metal oxides and non-metal oxides. For purposes of the present disclosure, silicon is considered to be a metal.

The melting point of a thermoplastic polymer, unless otherwise specified, is determined by ASTM E794-06(2018) with 10° C./min ramping and cooling rates.

The softening temperature or softening point of a thermoplastic polymer, unless otherwise specified, is determined by ASTM D6090-17. The softening temperature can be measured by using a cup and ball apparatus available from Mettler-Toledo using a 0.50 gram sample with a heating rate of 1° C./min.

As used herein, the term "near-infrared" region refers to a wavelength range of about 700 nm to about 1400 nm, which is sometimes referred to as the IR-A region (as specified by the International Commission on Illumination).

As used herein, the term "blended" refers a state of being substantially uniformly mixed.

As used herein, the term "localized" refers to a state of being unmixed or non-uniformly mixed.

Figure 2:
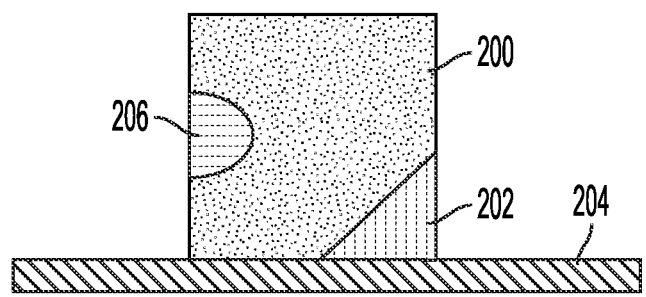
FIG. 2 is a diagram of an illustrative printed object having overhangs.

Before addressing various aspects of the present disclosure in further detail, a brief discussion of additive manufacturing processes, particularly fused filament fabrication processes for fabrication of printed object (parts), will first be provided so that certain features of the present disclosure can be better understood. FIG. 1 is a schematic of an illustrative fused filament fabrication process for producing a printed object using a build material and a removable support material. As shown in FIG. 1, print head 100 includes first extruder 102a and second extruder 102b, which are each configured to receive a filamentous printing material. Specifically, first extruder 102a is configured to receive first filament 104a from first payout reel 106a and provide molten stream 108a of a first printing material, and second extruder 102b is configured to receive second filament 104b from second payout reel 106b and provide molten stream 108b of a second printing material. Both molten streams are initially deposited upon a print bed (not shown in FIG. 1) to promote layer-by-layer growth of supported object 120. The first printing material (build material) supplied by first extruder 102a may comprise a thermoplastic polymer used to fabricate printed object 110 and also contain a metal precursor, and the second printing material (removable support material) supplied by second extruder 102b may be a dissolvable or degradable polymer, which is used to fabricate removable support 112 under overhang 114. Overhang 114 is not in direct contact with the print bed or a lower printed layer formed from the build material. In the printed object arrangement shown in FIG. 1, removable support 112 is interposed between overhang 114 and the print bed (not shown), but it is to be appreciated that in alternatively configured printed objects, removable support 114 may be interposed between two or more portions of printed object 110, FIG. 2, for example, shows a diagram of illustrative printed object 200, in which removable support 202 is interposed between an overhang defined between printed object 200 and print bed 204, and removable support 206 is interposed between two portions of printed object 200.

Referring again to FIG. 1, once printing of printed object 110 and removable support 112 is complete, supported object 120 may be subjected to support removal conditions 125 that result in elimination of removable support 112 (e.g., dissolution or disintegration conditions, or the like) and leave printed object 110 with overhang 114 unsupported thereon. Support removal conditions 125 may include, for example, contact of supported object 120 with a solvent or other liquid medium in which removable support 112 is dissolvable or degradable and printed object 110 is not. Removable support 112 may comprise a different thermoplastic polymer than does printed object 110 in order to support selective dissolution or degradation.

Polymer filaments of the present disclosure that are suitable for additive manufacturing, specifically fused filament fabrication, may comprise a thermoplastic polymer defining a filament body, and a metal precursor contacting the filament body, in which the metal precursor is activatable to form metal islands upon laser irradiation, particularly with a pulsed laser.

Figure 3:
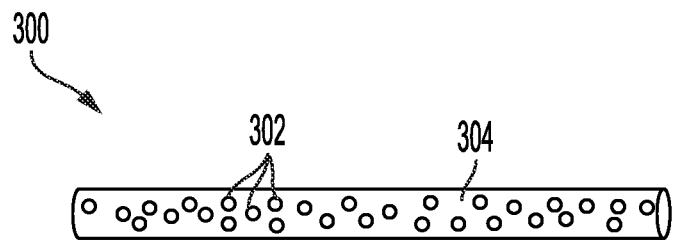
FIG. 3 is a diagram of an illustrative polymer filament having metal precursor particulates homogeneously blended in a thermoplastic polymer within a filament body.
Figure 4:
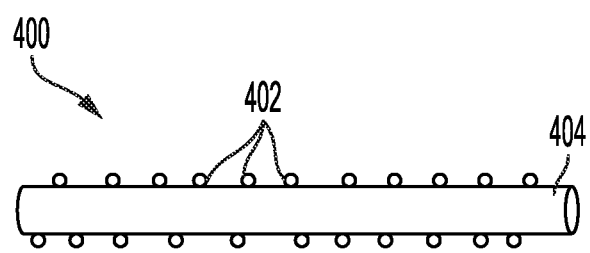
FIG. 4 is a diagram of an illustrative polymer filament having metal precursor particulates disposed upon an outer surface of a filament body comprising a thermoplastic polymer.
Figure 5:
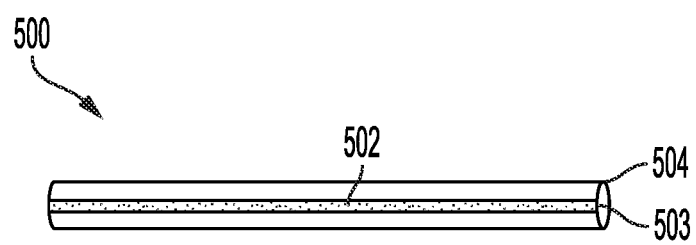
FIG. 5 is a diagram of an illustrative polymer filament having metal precursor particulates arranged within an inner core surrounded by an outer shell of a filament body comprising a thermoplastic polymer.

Non-limiting configurations for the polymer filaments that may be utilized in fused filament fabrication are discussed hereinafter and in reference to FIGS. 3-5. Any of these polymer filaments may be suitable for forming metal islands within a printed object, as discussed in greater detail hereinbelow. Illustrative forms for the polymer filaments may comprise a blend of the metal precursor and the thermoplastic polymer within the filament body, localization of the metal precursor upon an outer surface of the filament body, and/or localization of the metal precursor in an inner core of the polymer filament and the filament body surrounding the inner core as an outer shell. In any polymer filament configuration, the metal precursor may be present as a plurality of particulates contacting the filament body. FIG. 3 is a diagram of illustrative polymer filament 300 with metal precursor particulates 302 homogeneously blended with a thermoplastic polymer in filament body 304. FIG. 4 is a diagram of illustrative polymer filament 400 with metal precursor particulates 402 disposed upon an outer surface of filament body 404, which comprises a thermoplastic polymer. FIG. 5 is a diagram of illustrative polymer filament 500 with metal precursor particulates 502 arranged within inner core 503, which is surrounded by outer shell 504 of a filament body comprising a thermoplastic polymer. Polymer filaments having metal precursor particulates in multiple locations also possible and may be used in the disclosure herein. In non-limiting examples, metal precursor particulates may be both blended with a thermoplastic polymer and disposed upon an outer surface of a filament body, or both present in an inner core and disposed upon an outer surface of a filament body. When disposed upon the outer surface of the filament body, metal precursor particulates may be at least partially embedded in the thermoplastic polymer, bound to the thermoplastic polymer with an adhesive or sizing, covalently bonded to the thermoplastic polymer, or any combination thereof. Manufacturing techniques suitable for producing polymer filaments of each type are discussed further below.

Polymer filaments of the present disclosure may range from about 0.5 mm to about 5 mm in diameter, particularly about 1.5 mm to about 3.5 mm in diameter. Standard filament diameters for many three-dimensional printers employing fused filament fabrication technology are approximately 1.75 mm or 3.0 mm. It is to be recognized that any suitable polymer filament diameter may be used in accordance with the disclosure herein, provided that the polymer filament is compatible with a user's particular printing system. Similarly, the length and/or color of the polymer filaments is not believed to be particularly limited in the disclosure herein. Polymer filaments comprising a removable support material are similarly not believed to be particularly limited. Preferably, the polymer filaments disclosed herein are continuous and of spoolable length, such as at least about 1 foot, or at least about 5 feet, or at least about 10 feet, or at least about 25 feet, or at least about 50 feet, or at least about 100 feet, or at least about 250 feet, or at least about 500 feet, or at least about 1000 feet.

Metal precursors may be incorporated within or upon the filament body during manufacturing of the polymer filaments disclosed herein. Homogeneous mixing of a metal precursor and a thermoplastic polymer may be realized in melt blending/extrusion processes to provide a substantially uniform distribution of the metal precursor throughout the filament body of a polymer fiber. Modified melt blending/extrusion processes may be utilized to form polymer filaments having an inner core of metal precursor and an outer shell defined by the filament body. Optionally, the metal precursor may be blended with a thermoplastic polymer when forming the inner core, wherein the thermoplastic polymer in the inner core may be the same as or different than the thermoplastic polymer present within the filament body forming an outer shell of a polymer filament. A metal precursor may be deposited upon an outer surface of the filament body of a polymer fiber, for example, by spraying an aerosol of metal precursor particulates or a solution containing metal precursor upon a polymer fiber following extrusion before the thermoplastic polymer has fully solidified, wherein the metal precursor becomes adhered to the outer surface of the polymer fiber. Alternately, the polymer filament may be passed through a dispersion of the metal precursor in a solvent to afford dip coating-based deposition of the metal precursor upon the outer surface. As such, in at least some examples, in order to be compatible with melt blending/extrusion or similar processes, suitable metal precursors may be thermally stable to a temperature greater than or equal to that of the melting point or softening temperature of the thermoplastic polymer comprising the filament body. Other characteristics of suitable metal precursors may include, for example, electrical non-conductivity (before conversion to metal), good weatherability, ready admixing of metal precursor particulates with the thermoplastic polymer and/or solubility of the metal precursor in the thermoplastic polymer, and low toxicity.

When combined as particulates with a thermoplastic polymer, the metal precursor may range from about 10 nm to about 100 µm in size, or from about 50 nm to about 10 µm in size, or from about 100 nm to about 1 µm in size. Particle sizes in the disclosure herein represent D50 values, which refers to a diameter at which 50% of the sample (on a volume basis unless otherwise specified) is comprised of particles having a diameter less than said diameter. D50 may also be referred to as the "average particle size." Such average particle size measurements may be made by analysis of optical images or using onboard software of a Malvern Mastersizer 3000 Aero S instrument, which uses light scattering techniques for particle size measurement. Optionally, particulates of a metal precursor may be further treated with an organic coupling agent (e.g., silane coupling agents and the like) to promote compatibility, dispersion, and or bonding with the thermoplastic polymer defining the filament body. Particulates of an infrared radiation absorber, discussed further below, may be incorporated upon or within the polymer filaments by similar processes and be present within a similar range of sizes, which may be the same as or different than particulates of a metal precursor.

Especially suitable metal precursors may be activatable by a laser operating in the infrared region (including the near-infrared region), visible region, or ultraviolet region of the electromagnetic spectrum. Thus, suitable laser irradiation wavelengths may be selected from those residing within a range of about 200 nm to about 14,000 nm, particularly an irradiation wavelength ranging from about 1020 nm to about 1070 nm. Suitable lasers, particularly pulsed laser variants thereof, may include excimer lasers operating in the ultraviolet region of the electromagnetic spectrum, solid-state lasers, fiber lasers, semiconductor lasers (laser diodes), and $CO_2$ lasers (emission wavelength at 10,600 nm). When used for promoting metal activation, a $CO_2$ laser may be operated at a laser intensity (laser power per unit area) higher than that used for promoting polymer consolidation through melting or softening of the thermoplastic polymer. As a result of the high laser intensities, pulsed wave operation of a laser may be desirable when activating a metal precursor.

In the disclosure herein, frequency-doubled or frequency-tripled Nd:YAG lasers or similar solid-state lasers may provide visible radiation (532 nm) or ultraviolet radiation (355 nm), whereas the non-multiplied variant may provide near-infrared radiation at 1064 nm. Other frequency-multiplied lasers may also be used in the disclosure herein.

The near-infrared region may be particularly suitable for practicing the disclosure herein due to the ready availability of solid-state lasers or fiber lasers providing electromagnetic radiation in this region of the electromagnetic spectrum. For example, suitable lasers operating in the near-infrared region of the electromagnetic spectrum include, for example, Nd (neodymium)-doped solid-state lasers with an emission wavelength of about 1064 nm, such as Nd:YAG (yttrium aluminum garnet), $Nd:YVO_4$ (yttrium orthovanadate) and Nd:YLF (yttrium lithium fluoride) lasers; solid state lasers doped with other metals with an operating wavelength about 1020 nm to about 1050 nm; and fiber lasers, such as Yb-doped fiber lasers, with an emission about 1030 nm to about 1070 nm. Lasers suitable for use in the disclosure herein for activating a metal precursor may be operable in a pulsed wave mode to provide high pulse laser intensity for effectively converting a metal precursor into metal islands, as well as affording polymer surface ablation and roughening to promote strong metal adhesion following activation of the metal precursor. Particular examples of suitable metal precursors may include those that are activatable by a pulsed laser beam having an emission wavelength ranging from about 1020 nm to about 1070 nm, which resides in the near-infrared region of the electromagnetic spectrum. Such lasers may be operated at a power of about 1 W to about 10 W, a pulse frequency of about 10 kHz to about 120 kHz, and a scanning speed of about 0.1 m/s to about 10 m/s. The particular metal precursor employed may dictate the type of pulsed laser used for forming metal islands and the emission wavelength thereof, as discussed for some particular examples hereinafter.

Particular examples of suitable metal precursors for use in the disclosure herein that are capable of undergoing activation in the foregoing manner may include one or more of the following materials:

Copper oxide or a mixed oxide of copper and a metal selected from antimony, aluminum, cesium, cobalt, chromium, magnesium, manganese, nickel, tin, titanium, silver, iron, zinc, and zirconium. Particular examples of mixed oxides of copper include, for example, copper chromium oxide spinel (copper chromite), copper aluminum oxide, copper iron oxide, and the like. Copper chromite, for example, may be suitably activated at a pulsed laser emission wavelength of 1060 nm, such as with a Nd:YAG laser.

Copper hydroxide, copper hydroxide phosphate, copper phosphate, copper sulfate, copper thiocyanate, or any combination thereof. Unless otherwise indicated, these copper salts contain copper in the +2 oxidation state (cupric salts). Copper thiocyanate maybe present in either the +1 or +2 oxidation state.

A metal-organic complex (metal-ligand complex) comprising a metal selected from copper, silver, palladium, or any combination thereof. Suitable metal-organic complexes may include, for instance, metal monocarboxylate complexes, metal dicarboxylate complexes, metal acetylacetonate complexes, metal salicylaldiminato complexes, or the like. Particular examples of suitable metal-organic complexes may include, but are not limited to, copper carboxylates and dicarboxylates, such as copper oxalate and copper oleate; copper acetylacetonate; copper salen (salen=N,N'-bis(salicylidene)ethylenediamine); silver carboxylates, such as silver neodecanoate; and palladium carboxylates, such as palladium acetate and palladium neodecanoate. Palladium-containing metal-organic complexes may be converted to metal with a pulsed laser emitting in the ultraviolet region of the electromagnetic spectrum, such as with an excimer laser. Some silver-containing metal-organic complexes, in contrast, may be suitably converted to metal using a pulsed laser emitting in the visible region of the electromagnetic spectrum.

Even more particular examples of metal precursors suitable for use in the disclosure herein may include, for example, PK3095 black pigment (Ferro Corporation) and Black 1G pigment black 28 (The Shepherd Color Company), both of which comprise copper chromate spinel.

In addition to a metal precursor, the polymer filaments of the present disclosure may further comprise an infrared radiation absorber. Exemplary materials capable of absorbing infrared radiation to promote formation of metal from a metal precursor are discussed further below. When present, an infrared radiation absorber may be present in the same location as the metal precursor and/or in a different location than the metal precursor. Like the metal precursor, an infrared radiation absorber may also be present as a plurality of particulates in the polymer filaments disclosed herein.

The strength of absorption of infrared radiation, particularly in the near-infrared region of the electromagnetic spectrum, by the metal precursor may dictate whether irradiation with a pulsed laser results in sufficient conversion of the metal precursor into the corresponding metal. In the case of sufficiently strong absorption, the metal precursor may be adequate alone. If the strength of the infrared radiation absorption is weaker, an infrared radiation absorber may also be combined with the thermoplastic polymer to promote more efficient conversion of the metal precursor into metal. Suitable infrared radiation absorbers may include, but are not limited to, non-stoichiometric metal oxides containing a metal such as, for example, antimony, bismuth, boron, copper, indium, titanium, tin, cesium, zirconium, molybdenum, vanadium, iron, or any combination thereof. Specific examples of suitable infrared radiation absorbers may include, for example, antimony-doped tin oxide, antimony-doped indium tin oxide; reduced indium tin oxide, oxygen-deficient bismuth oxide, and any combination thereof. Carbon black may also constitute a suitable infrared radiation absorber in some instances. When present, an infrared radiation absorber may be included in the polymer filaments at a loading of about 0.01 wt. % to about 10 wt. %, or about 0.5 wt. % to about 5 wt. % with respect to the thermoplastic polymer.

Depending on the infrared radiation absorption strength and whether an infrared radiation absorber is present, the metal precursor may comprise about 1 wt. % to about 30 wt. % of the polymer filaments disclosed herein based on total mass, or about 2 wt. % to about 25 wt. % of the polymer filaments based on total mass, or about 5 wt. % to about 15 wt. % of the polymer filaments based on total mass.

Examples of thermoplastic polymers suitable for use in forming a filament body according to the disclosure herein may include, but are not limited to, acrylonitrile-butadiene-styrene (ABS), high-impact polystyrene (HIPS), polystyrene, polylactic acid (PLA), polyurethanes (PU), polyvinylpyrrolidone-co-polyvinyl acetate (PVP-co-PVA), any copolymer thereof, or any combination thereof. These are among the most common thermoplastic polymers employed as build materials in additive manufacturing. Other suitable build materials for forming polymer filaments in the disclosure herein include, for example, polyamides, polyesters, polycarbonates, polyethylene, polypropylene, polyethylene terephthalate, polyetheretherketone, and various copolymers thereof. Polymer composites may also be used as suitable build materials in some instances. Thermoplastic polymers suitable for use as build materials in the disclosure herein may exhibit a softening temperature or melting point sufficient to allow extrusion thereof at a temperature ranging from about 150° C. to about 300° C., or from about 175° C. to about 275° C., or from about 180° C. to about 250° C., as determined by the ASTM methods referenced above. PLA, for instance, has a melting point ranging from about 150° C. to about 160° C.

Some or other examples of thermoplastic polymers that may be suitable for use in forming polymer filaments according to the disclosure herein include, but are not limited to, polyamides (e.g., Nylon-6, Nylon-12, and the like), polyurethanes, polyethylenes, polypropylenes, polyacetals, polycarbonates, polyethylene terephthalates, polybutylene terephthalates, polystyrenes, polyvinyl chlorides, polytetrafluoroethenes, polyesters (e.g., polylactic acid), polyethers, polyether sulfones, polyetherether ketones, polyacrylates, polymethacrylates, polyimides, acrylonitrile butadiene styrene (ABS), polyphenylene sulfides, vinyl polymers, polyarylene ethers, polyarylene sulfides, polysulfones, polyether ketones, polyaryl ether ketones (PAEK), polyamide-imides, polyetherimides, polyetheresters, copolymers comprising a polyether block and a polyamide block (PEBA or polyether block amide), grafted or ungrafted thermoplastic polyolefins, functionalized or nonfunctionalized ethylene/vinyl monomer polymer, functionalized or nonfunctionalized ethylene/alkyl (meth)acrylates, functionalized or nonfunctionalized (meth)acrylic acid polymers, functionalized or nonfunctionalized ethylene/vinyl monomer/alkyl (meth)acrylate terpolymers, ethylene/vinyl monomer/carbonyl terpolymers, ethylene/alkyl (meth)acrylate/carbonyl terpolymers, methylmethacrylate-butadiene-styrene (MBS)-type core-shell polymers, polystyrene-block-polybutadiene-block-poly(methyl methacrylate) (SBM) block terpolymers, chlorinated or chlorosulphonated polyethylenes, polyvinylidene fluoride (PVDF), phenolic resins, poly(ethylene/vinyl acetate)s, polybutadienes, polyisoprenes, styrenic block copolymers, polyacrylonitriles, silicones, and the like, and any combination thereof. Copolymers comprising one or more of the foregoing may also be used in the present disclosure.

Particularly suitable examples of thermoplastic polymers for use in the disclosure herein may include polyamides, such as Nylon 6 or Nylon 12; acrylonitrile butadiene styrene; polylactic acid; polyurethanes; poly(arylene ether)s; polyaryletherketones; polycarbonates; polyimides; polyphenylene sulfides; poly(arylene sulfone)s; polyesters, such as polyethylene terephthalate or polybutylene terephthalate; and any combination thereof.

More specific examples of suitable polyamides include, but are not limited to, polycaproamide (Nylon 6, polyamide 6, or PA6), poly(hexamethylene succinamide) (Nylon 46, polyamide 46, or PA46), polyhexamethylene adipamide (Nylon 66, polyamide 66, or PA66), polypentamethylene adipamide (Nylon 56, polyamide 56, or PA56), polyhexamethylene sebacamide (Nylon 610, polyamide 610, or PA610), polyundecaamide (Nylon 11, polyamide 11, or PA11), polydodecaamide (Nylon 12, polyamide 12, or PA12), and polyhexamethylene terephthalamide (Nylon 6T, polyamide 6T, or PA6T), Nylon 10.10 (polyamide 10.10 or PA10.10), Nylon 10.12 (polyamide 10.12 or PA10.12), Nylon 10.14 (polyamide 10.14 or PA10.14), Nylon 10.18 (polyamide 10.18 or PA10.18), Nylon 6.10 (polyamide 6.10 or PA6.10), Nylon 6.18 (polyamide 6.18 or PA6.18), nylon 6.12 (polyamide 6.12 or PA6.12), Nylon 6.14 (polyamide 6.14 or PA6.14), semi-aromatic polyamide, the like, and any combination thereof. Copolyamides may also be used. Examples of suitable copolyamides include, but are not limited to, PA 11/10.10, PA 6/11, PA 6.6/6, PA 11/12, PA 10.10/10.12, PA 10.10/10.14, PA 11/10.36, PA 11/6.36, PA 10.10/10.36, and the like, and any combination thereof. Polyesteramides, polyetheresteramides, polycarbonate-esteramides, and polyether-block-amides, which may be elastomeric, may also be used.

Examples of suitable polyurethanes include, but are not limited to, polyether polyurethanes, polyester polyurethanes, mixed polyether and polyester polyurethanes, the like, and any combination thereof. Examples of suitable polyurethanes include, but are not limited to, poly[4,4'-methylenebis(phenylisocyanate)-alt-1,4-butanediol/di(propylene glycol)/polycaprolactone], ELASTOLLAN® 1190A (a polyether polyurethane elastomer, available from BASF), ELASTOLLAN® 1190A10 (a polyether polyurethane elastomer, available from BASF), and the like, and any combination thereof.

Suitable thermoplastic polymers may be elastomeric or non-elastomeric. Some of the foregoing examples of thermoplastic polymers may be elastomeric or non-elastomeric depending on the specific composition of the polymer. For example, polyethylene that is a copolymer of ethylene and propylene may be elastomeric or not depending on the amount of propylene present in the polymer.

Elastomeric thermoplastic polymers generally fall within one of six classes: styrenic block copolymers, thermoplastic polyolefin elastomers, thermoplastic vulcanizates (also referred to as elastomeric alloys), thermoplastic polyurethanes, thermoplastic copolyesters, and thermoplastic polyamides (typically block copolymers comprising polyamide), any of which may be used in the disclosure herein. Examples of elastomeric thermoplastic polymers can be found in Handbook of Thermoplastic Elastomers, 2nd ed., B. M. Walker and C. P. Rader, eds., Van Nostrand Reinhold, New York, 1988. Examples of elastomeric thermoplastic polymers include, but are not limited to, elastomeric polyamides, polyurethanes, copolymers comprising a polyether block and a polyamide block (PEBA or polyether block amide), methyl methacrylate-butadiene-styrene (MBS)-type core-shell polymers, polystyrene-block-polybutadiene-block-poly(methyl methacrylate) (SBM) block terpolymers, polybutadienes, polyisoprenes, styrenic block copolymers, and polyacrylonitriles), silicones, and the like. Elastomeric styrenic block copolymers may include at least one block selected from the group of: isoprene, isobutylene, butylene, ethylene/butylene, ethylene-propylene, and ethylene-ethylene/propylene. More specific elastomeric styrenic block copolymer examples include, but are not limited to, poly (styrene-ethylene/butyl ene), poly(styrene-ethylene/butylene-styrene), poly(styrene-ethylene/propylene), styrene-ethylene/propylene-styrene), poly(styrene-ethylene/propylene-styrene-ethylene-propylene), poly(styrene-butadiene-styrene), poly(styrene-butylene-butadiene-styrene), and the like, and any combination thereof.

In particular applications, the polymer filaments disclosed herein may be utilized in additive manufacturing processes taking place by fused filament fabrication. Printed objects initially obtained from the additive manufacturing process may feature a fused filament fabrication polymer matrix (i.e., formed through layer-by-layer consolidation of a polymer filament comprising a thermoplastic polymer) that comprises a metal precursor within at least a portion thereof, in which the metal precursor is activatable to form metal islands upon laser irradiation. Printed objects formed through layer-by-layer consolidation of a polymer filament may be distinguished from those prepared by consolidation of polymer particulates (e.g., during powder bed fusion processes) by the lack of grain boundaries characteristic of incomplete particulate fusion. That is, there may be residual grain boundaries between incompletely fused polymer particulates in printed objects formed through powder bed fusion and other particulate consolidation processes, whereas those formed through fused filament fabrication may be characterized by evidence of boundaries between adjacent printed lines and layers. Properly conducted, however, printed objects formed through these two techniques may be largely indistinguishable from one another on the macroscale. Fused filament fabrication may be advantageous from a cost perspective, since less printing material may be wasted during the layer-by-layer deposition process. Printed objects formed from polymer filaments of the present disclosure may comprise a like amount of metal precursor within the polymer matrix, such as about 1% to about 30% of the printed object by weight, for example.

Subsequently, the metal precursor in the printed objects may be converted to metal (e.g., a plurality of discontinuous metal islands) in a desired pattern using laser irradiation, such as provided by a pulsed laser and described in more detail above. Once formed, the metal islands may then become interconnected by electroless plating to form one or more conductive traces upon the surface of the printed object.

Accordingly, additive manufacturing processes of the present disclosure may comprise: providing a polymer filament comprising a thermoplastic polymer defining a filament body, and a metal precursor contacting the filament body, in which the metal precursor is activatable to form metal islands upon laser irradiation, such as with a pulsed laser, and forming a printed object from the polymer filament through layer-by-layer deposition, such that the metal precursor remains substantially unconverted to metal while forming the printed object. Such printed objects may comprise a polymer matrix formed through layer-by-layer consolidation of the polymer filament, such that the metal precursor is present in at least a portion of the printed object. When present, an infrared radiation absorber may be present within at least a portion of the printed object as well. The metal precursor and the infrared radiation absorber may be present in the same location or a different location within the printed object.

Suitable conditions for performing layer-by-layer deposition and consolidation of the polymer filament by fused filament fabrication are not believed to be particularly limited and may take place under conventional deposition conditions familiar to persons having ordinary skill in the art. In general, the fused filament fabrication conditions take place above the melting point or softening temperature of the thermoplastic polymer and occur under the control of a computer.

After formation of a printed object containing a metal precursor in accordance with the disclosure herein, a portion of the metal precursor may be converted to metal islands, which may be subsequently converted to one or more conductive traces comprising a metal. More specifically, methods of the present disclosure may comprise activating a portion of the metal precursor within the printed object using laser irradiation, particularly a pulsed laser, to form a plurality of discontinuous metal islands in a predetermined pattern upon a surface of the printed object. Suitable pulsed lasers may include, but are not limited to, Nd:YAG lasers, vanadate lasers, and fiber lasers. Other suitable lasers and conditions for promoting metal formation are specified above.

After forming discontinuous metal islands, the metal islands may be interconnected by performing electroless plating to form one or more conductive traces. The one or more conductive traces are electrically conductive and metallic and may be formed from a variety of suitable metals, such as copper, silver, gold or nickel. Multiple conductive traces may be separated from one another by about 150 µm or less in a non-limiting example of the present disclosure. Suitable electroless plating conditions will be familiar to one having ordinary skill in the art and may be employed in the disclosure herein. Copper, for example, may be plated under electroless conditions using copper ethylenediaminetetraacetic acid complex (Cu-EDTA)/formaldehyde. In another particular example, copper-nickel alloys may be plated under electroless conditions using copper hypophosphate in the presence of nickel ions as a mediator. Nickel may be plated under electroless conditions using a nickel salt, such as nickel sulfate, for example, and a reducing agent such as hypophosphate or borohydride.

Figure 6:
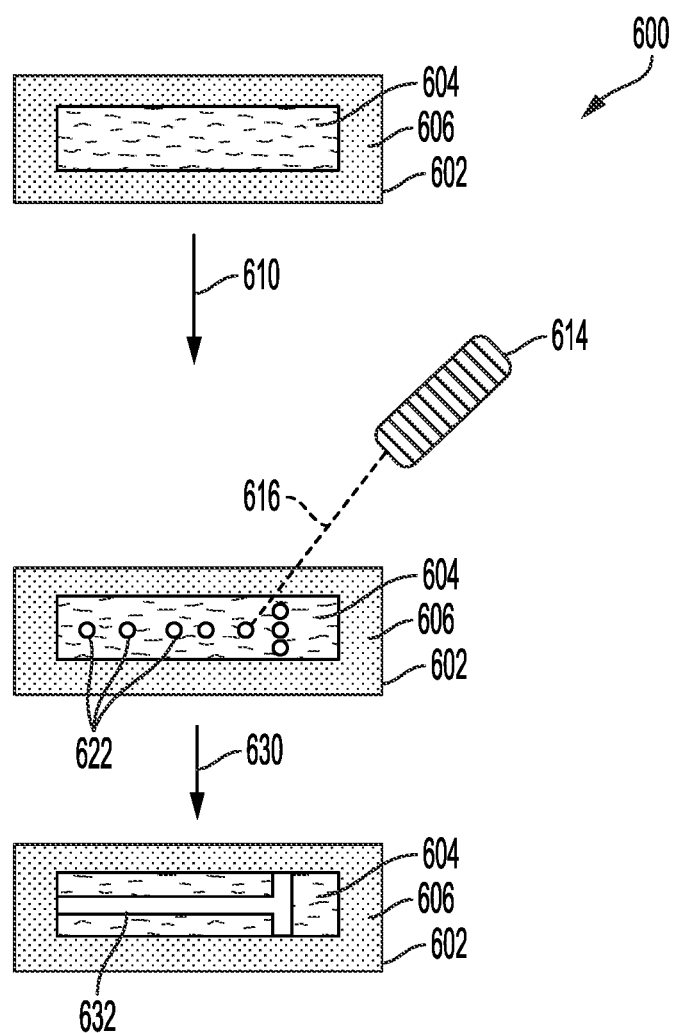
FIG. 6 is an illustrative process diagram demonstrating formation of a printed object by fused filament fabrication, followed by activation of a metal precursor and electroless plating to form a conductive trace.

FIG. 6 is an illustrative process diagram demonstrating formation of a printed object by fused filament fabrication, followed by activation of a metal precursor and electroless plating to form a conductive trace, as viewed from the top of the printed object. In process 600, printed object 602 is first formed in a manner similar to that described above in more detail, particularly in reference to FIG. 1 (printing details not shown in FIG. 6). It is to be appreciated that a metal precursor may be present throughout or in a localized portion of a polymer matrix within printed object 602. As depicted in FIG. 6, metal precursor is localized in metallizable region 604. Non-metallizable region 606 may be deposited concurrently with metallizable region 604 by concurrently depositing (printing) a polymer filament lacking metal precursor. In addition and/or alternately, one or more overhangs within printed object 602 may be formed by depositing a removable support formed from a degradable and/or dissolvable material provided from a separate polymer filament. Thus, fused filament fabrication processes of the present disclosure may utilize at least a polymer filament comprising the metal precursor and optionally may utilize one or more additional polymer filaments lacking a metal precursor for forming printed object 602 in a desired shape with metallization capabilities thereupon.

In metal conversion 610, metallization region 604 is selectively irradiated with pulsed laser beam 616 from laser 614 to define metal islands 622 in a desired pattern upon the surface of printed object 602. Laser 614 may be a near-infrared pulsed laser in particular process configurations.

After forming metal islands 622, electroless plating 630 may then be performed to define conductive trace 632 in a desired pattern upon the surface of printed object 602. Conductive trace 632 interconnects metal islands 622 with one another. In the configuration depicted in FIG. 6, conductive trace 632 remains confined within metallization region 604, but may extend over the entirety of the surface of printed object 602 in alternative configurations.

Examples of printed objects formable using the polymer filaments disclosed herein are not considered to be particularly limited and may include, for example, containers (e.g., for food, beverages, cosmetics, personal care compositions, medicine, and the like), shoe soles, toys, furniture parts, decorative home goods, plastic gears, screws, nuts, bolts, cable ties, medical items, prosthetics, orthopedic implants, learning aids, 3D anatomy models, robotic parts, biomedical devices (orthotics), home appliances, dentistry implants, automotive and airplane/aerospace parts, electronics, sporting goods, and the like. Many of these printed objects may benefit from the introduction of one or more conductive traces thereon, as discussed herein.

Embodiments disclosed herein include:

A. Polymer filaments compatible with fused filament fabrication. The polymer filaments comprise: a thermoplastic polymer defining a filament body; and a metal precursor contacting the filament body, the metal precursor being activatable to form metal islands upon laser irradiation.

B. Printed objects. The printed objects comprise: a fused filament fabrication polymer matrix comprising a metal precursor within at least a portion thereof, the metal precursor being activatable to form metal islands upon laser irradiation.

C. Methods for forming a printed object by fused filament fabrication. The methods comprise: providing a polymer filament comprising a thermoplastic polymer defining a filament body, and a metal precursor contacting the filament body, the metal precursor being activatable to form metal islands upon laser irradiation; and forming a printed object from the polymer filament through layer-by-layer deposition; wherein the metal precursor remains substantially unconverted to metal while forming the printed object.

Each of embodiments A-C may have one or more of the following additional elements in any combination:

Element 1: wherein the metal precursor is activatable by an infrared or near-infrared pulsed laser.

Element 2: wherein the metal precursor is activatable at a wavelength ranging from about 1020 nm to about 1070 nm.

Element 3: wherein the metal precursor is blended with the thermoplastic polymer, localized upon an outer surface of the filament body, or any combination thereof.

Element 4: wherein the metal precursor is localized in an inner core of the polymer filament and the filament body surrounds the inner core as an outer shell.

Element 5: wherein the metal precursor comprises at least one material selected from the group consisting of copper oxide; a mixed oxide of copper and a metal selected from the group consisting of antimony, aluminum, cesium, cobalt, chromium, magnesium, manganese, nickel, tin, titanium, silver, iron, zinc, and zirconium; copper chromium oxide spinel; copper aluminum oxide; copper hydroxide; copper hydroxide phosphate; copper phosphate; copper sulfate; copper thiocyanate; a metal-organic complex comprising a metal selected from the group consisting of copper, silver, palladium, and any combination thereof; and any combination thereof.

Element 6: wherein the metal precursor comprises about 1% to about 30% of the polymer filament by weight.

Element 6A: wherein the metal precursor comprises about 1% to about 30% of the printed object by weight.

Element 7: wherein the polymer filament further comprises an infrared radiation absorber contacting the filament body.

Element 7A: wherein the polymer filament further comprises an infrared radiation absorber within the polymer matrix.

Element 8: wherein the infrared radiation absorber comprises a non-stoichiometric metal oxide.

Element 9: wherein the metal precursor comprises a plurality of particulates.

Element 10: wherein the metal precursor is thermally stable to a temperature greater than or equal to that of a melting point or softening temperature of the thermoplastic polymer.

Element 11: wherein the method further comprises activating a portion the metal precursor within the printed object using a pulsed laser to form a plurality of discontinuous metal islands in a predetermined pattern upon a surface of the printed object.

Element 12: wherein the method further comprises performing electroless plating to form one or more conductive traces interconnecting the plurality of discontinuous metal islands.

By way of non-limiting example, exemplary combinations applicable to A, B and C include, but are not limited to: 1 and 2; 1, and 3 or 4; 1 and 5; 1, and 6 or 6A; 1, and 7 or 7A; 1, 7 or 7A, and 8; 1 and 9; 1 and 10; 2, and 3 or 4; 2 and 5; 2, and 6 or 6A; 2, and 7 or 7A; 2, 7 or 7A, and 8; 2 and 9; 2 and 10; 3 or 4, and 5; 3 or 4, and 6 or 6A; 3 or 4, and 7 or 7A; 3 or 4, 7 or 7A, and 8; 3 or 4, and 9; 3 or 4, and 10; 5, and 6 or 6A; 5, and 7 or 7A; 5, 7 or 7A, and 8; 5 and 9; 5 and 10; 6 or 6A, and 7 or 7A; 6 or 6A, 7 or 7A, and 8; 6 or 6A, and 9; 6 or 6A, and 10; 7 or 7A, and 8; 7 or 7A, and 9; 7 or 7A, and 10; and 9 and 10. Embodiment C may feature any of the foregoing and further include 11 and/12 in further combination with any of the foregoing.

To facilitate a better understanding of the present disclosure, the following examples of preferred or representative embodiments are given. In no way should the following examples be read to limit, or to define, the scope of the invention.

EXAMPLES

Filaments were prepared using a Filabot EX6 filament extruder. The extruder consists of an extruder, an air path, and a filament winder. The extruder has four zones of heating: i) a feed port nozzle, ii) a back zone, iii) a middle zone, and iv) a front zone. The extrusion speed is controlled by adjusting the voltage. The nozzle can be interchanged with nozzles of different diameters. The air path can be adjusted for airflow. The position of the air path can be adjusted by with respect to the distance from the nozzle, or raising the air path on a jack to maintain a constant filament diameter. Filament diameters were measured using an inline thickness gauge.

Polymer composites used for filament preparation were first prepared by melt mixing 100 parts by weight of polymer resin with 10 parts by weight of copper chromium oxide spinel in a 600P Haake batch mixer. The resultant polymer blends were then crushed into small portions and fed to the filament extruder.

Composite filaments were prepared as above using polyamide-12 (PA-12), acrylonitrile-butadiene-styrene (ABS), or polycaprolactone (PCL). These samples are designated as Samples 1-3 in Table 1 below.

TABLE 1

| | Example 1 | Example 2 | Example 3 |
|---|---|---|---|
| Polymer resin | PA 12 | ABS | PCL |
| Feed Temperature | 45° C. | 45° C. | 40° C. |
| Back Temp | 175° C. | 170° C. | 80° C. |
| Middle Temp | 175° C. | 170° C. | 80° C. |
| Front Temp | 175° C. | 170° C. | 70° C. |
| Nozzle size | 3.0 mm | 3.0 mm | 3.0 mm |
| Air flow | 100% | 100% | 100% |
| Winding speed | 1.0 rpm | 1.0 rpm | 0.6-0.8 rpm |
| Average filament diameter | 1.6 mm | 1.7 mm | 1.6 mm |

An additional sample was obtained under similar conditions by mixing 5 wt. % copper (II) acetyleacetonate and 1 wt. % antimony tin oxide (average particle size=15 nm) in ABS and forming a composite and continuous filament under similar conditions.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

One or more illustrative embodiments are presented herein. Not all features of a physical implementation are described or shown in this application for the sake of clarity. It is understood that in the development of a physical embodiment of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for one of ordinary skill in the art and having benefit of this disclosure.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

What is claimed is the following:

1. A polymer filament compatible with fused filament fabrication, comprising:
   a thermoplastic polymer defining a filament body; and
   a metal precursor contacting the filament body, the metal precursor being activatable to form metal islands upon laser irradiation, wherein the metal precursor comprises copper chromite.

2. The polymer filament of claim 1, wherein the metal precursor is activatable by an infrared or near-infrared pulsed laser.

3. The polymer filament of claim 1, wherein the metal precursor is activatable at a wavelength ranging from about 1020 nm to about 1070 nm.

4. The polymer filament of claim 1, wherein the metal precursor is blended with the thermoplastic polymer, localized upon an outer surface of the filament body, or any combination thereof.

5. The polymer filament of claim 1, wherein the metal precursor is localized in an inner core of the polymer filament and the filament body surrounds the inner core as an outer shell.

6. The polymer filament of claim 1, wherein the metal precursor comprises about 1% to about 30% of the polymer filament by weight.

7. The polymer filament of claim 1, further comprising:
   an infrared radiation absorber contacting the filament body.

8. The polymer filament of claim 7, wherein the infrared radiation absorber comprises a non-stoichiometric metal oxide.

9. The polymer filament of claim 1, wherein the metal precursor comprises a plurality of particulates.

10. The polymer filament of claim 1, wherein the metal precursor is thermally stable to a temperature greater than or equal to that of a melting point or softening temperature of the thermoplastic polymer.

11. A method comprising:
    providing a polymer filament comprising a thermoplastic polymer defining a filament body, and a metal precursor contacting the filament body, the metal precursor being activatable to form metal islands upon laser irradiation; and
    forming a printed object from the polymer filament through layer-by-layer deposition;
    wherein the metal precursor remains substantially unconverted to metal while forming the printed object, wherein the metal precursor comprises copper chromite.

12. The method of claim 11, further comprising:
    activating a portion the metal precursor within the printed object using a pulsed laser to form a plurality of discontinuous metal islands in a predetermined pattern upon a surface of the printed object.

13. The method of claim 12, further comprising:
    performing electroless plating to form one or more conductive traces interconnecting the plurality of discontinuous metal islands.

* * * * *